Oct. 27, 1936.        D. BROWN        2,058,663
AUTOMATIC BRICK AND TILE CUTTER
Filed Oct. 12, 1935        5 Sheets-Sheet 1

Inventor
D. Brown
by Hazard and Miller
Attorneys.

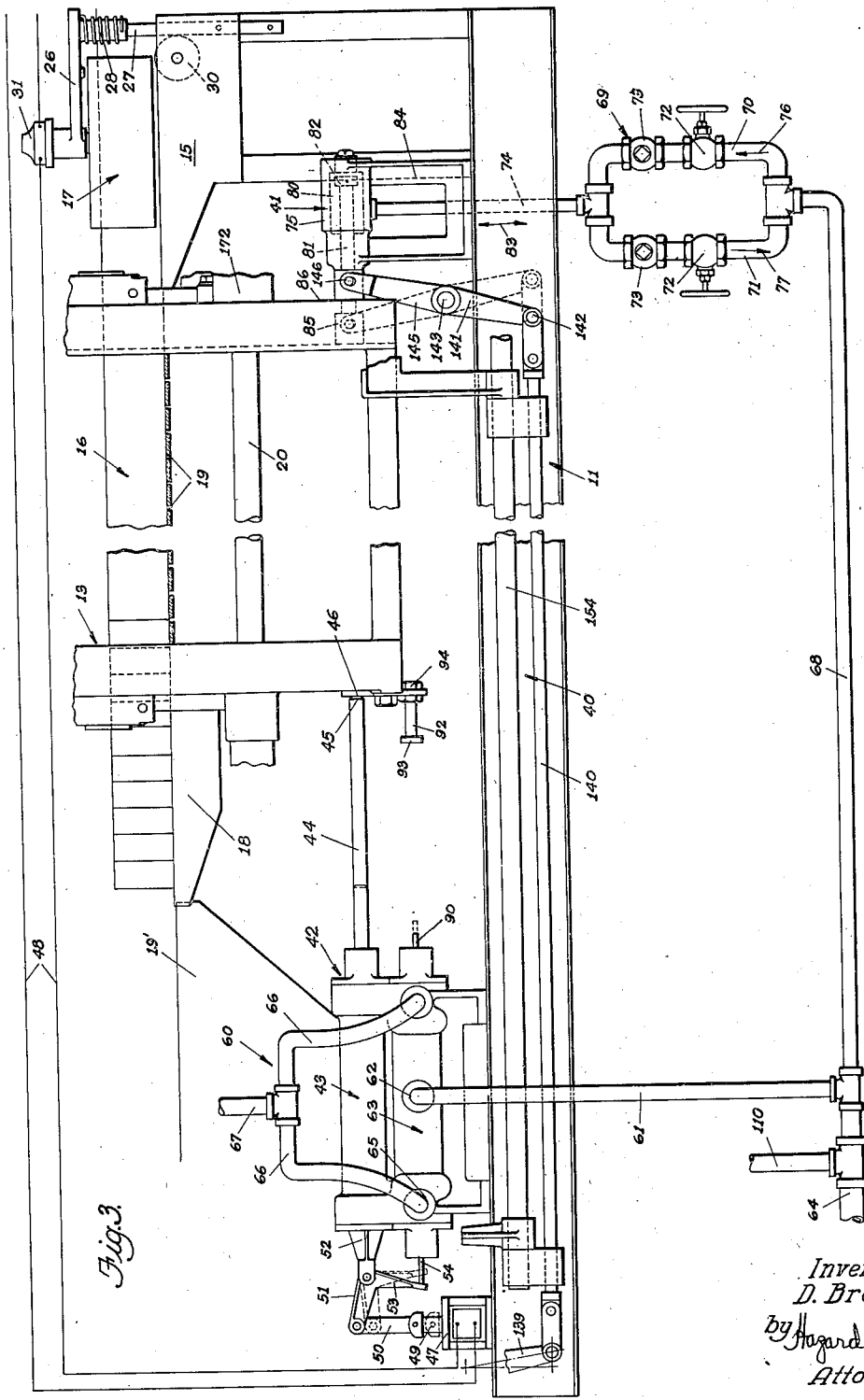

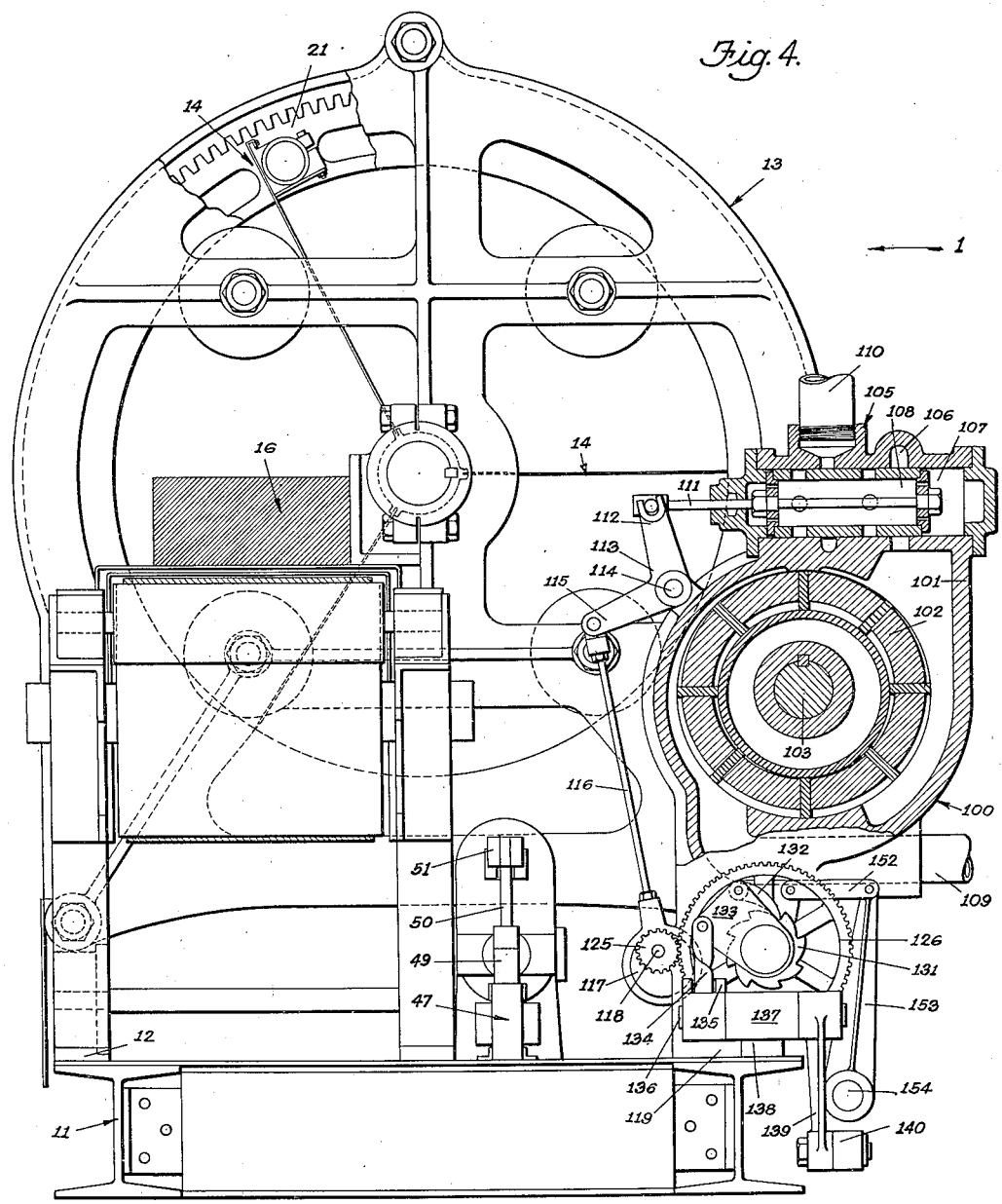

Oct. 27, 1936. D. BROWN 2,058,663
AUTOMATIC BRICK AND TILE CUTTER
Filed Oct. 12, 1935   5 Sheets-Sheet 5

Inventor
D. Brown
by Hazard and Miller
Attorneys.

Patented Oct. 27, 1936

2,058,663

UNITED STATES PATENT OFFICE 2,058,663

AUTOMATIC BRICK AND TILE CUTTER

Davis Brown, Los Angeles, Calif.

Application October 12, 1935, Serial No. 44,727

23 Claims. (Cl. 25—109)

My present invention is an improvement on the type of brick and tile cutters in which a column of clay is measured by a measuring drum located in the path of the feed of the column, to a rotary cutting reel; such reel having a series of wires so that in a partial rotation of the reel the column of clay is cut into sections to form individual bricks or tiles. In this whole procedure the cutting reel has a longitudinal movement with the continuously moving column of play and gives the rotational shearing cut while in motion, thus producing right angular cuts across the column. These former types of machines have generally been controlled by some type of mechanical drive through various clutches etc., to develop the reciprocating motion of the cutting carriage and to impart the rotary motion to the reel while making the cut.

Among the various features of improvement of my present invention, one consists of the employment of an electrical timing mechanism, interconnected with the measuring drum to control the reciprocating motion of the cutting reel during its initial movement, to accelerate to equal the speed of the column of clay. This employs a hydraulically controlled and actuated mechanism to give the initial movement in a forward direction to the cutting reel and after the complete cut is made, a complementary hydraulic mechanism to return the reel to its initial position.

A further feature of my invention consists in the employment of a motor which in the present instance is illustrated as a hydraulically operated and controlled motor which gives the intermittent rotation to the reel to produce the shear cuts through the column of clay. This motor also operates as a brake to instantly bring the reel to rest after a partial rotation.

A further feature of my invention relates to the interlinking of the electrical control of hydraulic valves by an electric timer operated by the measuring drum to control and produce the sequence of operations in proper timing, one in relation to the other. Thus an impetus and acceleration from rest is given to the carriage having the reel, at the moment the carriage is clamped in a known manner to the column of clay, causing the carriage to move at the same speed as this column during the cutting operation.

The second main step of the sequence is energizing the hydraulic motor to produce the rotation of a pinion drive which rotates the frame of the reel and thus causes the severing of the column of clay during the movement longitudinally of the reel in its forward direction. The next step of the sequence is in de-energizing the hydraulic rotary motor, which on account of the reaction of the hydraulic fluid acts as a hydraulic brake, instantly stopping the rotational action of the reel.

A further step in the main sequence of operations is by means of a hydraulically operated plunger to return the carriage with the reel to its initial position, during which return the reel is held from rotation by the hydraulic motor acting as the brake.

My invention is illustrated in connection with the accompanying drawings, in which, Fig. 1 is a front elevation of the machine with the carriage and cutting reel and associated mechanism in the initial or starting position, such figure being taken in the direction of the arrow 1 of Fig. 4.

Fig. 3 is an elevation similar to Fig. 1 with certain elements broken away and illustrating the hydraulic connections of the various operating cylinders and motor.

Fig. 4 is a vertical transverse section on the line 4—4 of Fig. 2 in the direction of the arrows, illustrating the hydraulic motor, the control valve therefor and the ratchets for actuating such valve.

Fig. 5 is a detail section on the line 5—5 of Fig. 2, showing one of the ratchets for operating the motor valve.

Figure 1:
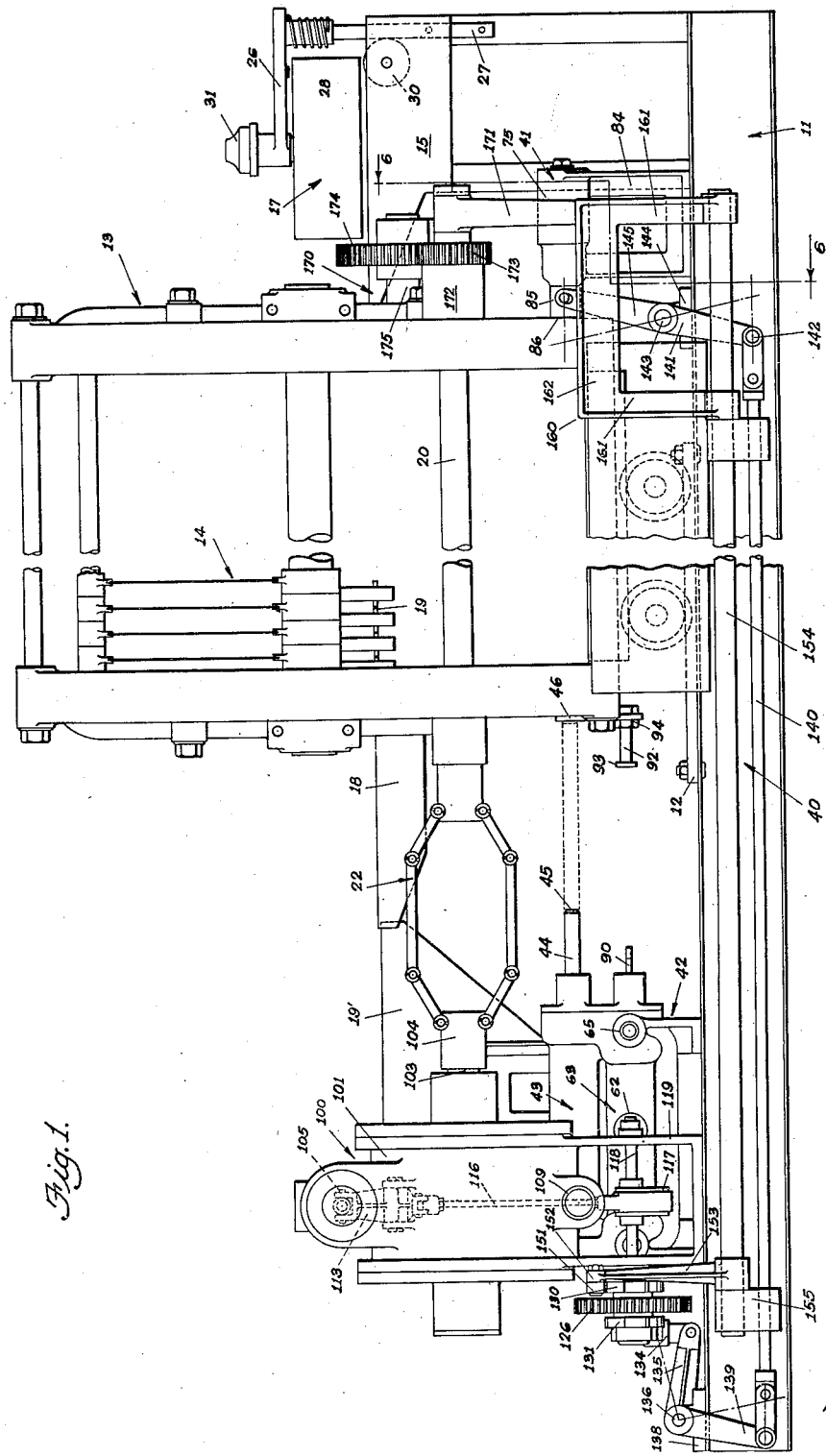

In my invention I employ a machine base 11 having a track 12 thereon, on which track is mounted the carriage 13, such carriage having the rotating reel 14. The reel is provided with cutting wires of the usual character and in fact, the carriage and substantially all the mechanism of the reel may be constructed in accordance with standard practice. In this standard practice there is provided a feeding table 15 over which the column of clay indicated at 16 is fed in the usual manner and measured by a measuring drum 17. The clay passes over the carriage table 18, this being provided with transverse slots 19 to accommodate the cutting wires. The cut bricks or tiles are then transferred to a discharge table 19' having an outwardly moving conveyor belt operating at higher speed than the feed of the column of clay to carry the cut bricks or tiles etc. from the machine.

In this commonly known practice it is usual to have an operating shaft 20 mounted in the carriage, having pinions meshing with a gear 21 of the intermittently rotatable reel. An expansion coupling 22 is used to transmit an intermittent drive to the shaft 20.

Figure 7:
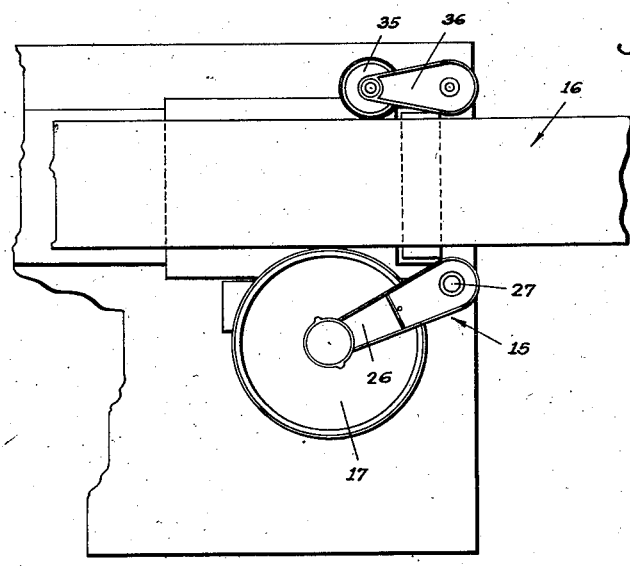
Fig. 7 is a plan of the measuring and timing mechanism taken in the direction of the arrow 7 of Fig. 2.

In my invention the measuring drum 17 is mounted on a vertical shaft 25 depending from an arm 26, such arm being supported by an upright post 27 secured to a fixed structure of the feeding table and having a spring 28 urging the feeding drum 17 against one side of the column of clay indicated at 16 (note Fig. 7). This column of clay is fed to the machine in any suitable manner, as for instance by an endless belt operating over a drum, one of which is shown at 30. On the shaft 25 which carries the measuring drum and thus rotating with the drum there is an electric distributor 31 which may be of any suitable known type, in which a rotating element makes periodical contact with one or more electric terminals. A complementary pressure resisting drum 35 engages the side of the column of clay opposite to that of the measuring drum and this pressure drum may be supported on an arm 36 connected to the feeding table in any known manner or as shown in connection with the support of the drum 17.

The mechanism for developing the reciprocating motion of the carriage is as follows, and comprises the carriage moving assembly designated generally by the numeral 40, in which there is an initial impulse mechanism 41 which also functions somewhat as a dash pot in retarding the carriage when returned to its initial position and a carriage return mechanism 42. The impulse mechanism 42 will first be described and comprises a cylinder 43 having a piston therein and a plunger rod 44 connected to the piston. This cylinder and piston may be of known types. The plunger end 45 is adapted to engage a contact surface 46 on the carriage to shift the carriage from the position of Fig. 2 to that shown in Figs. 1 and 3. The valve control mechanism for the cylinder 43 utilizes a solenoid 47 (note Fig. 3), or other suitable electrical device operatively connected by a circuit 48 through the timer 31. This solenoid has an armature 49 which may be pulled down on energizing the solenoid. This gives a downward pull on the link 50 which rocks a bell crank 51. This bell crank is pivoted on a bracket 52 connected to the end of the cylinder structure 43 and has an operating arm 53 which actuates a valve plunger 54. This controls the valves for energizing the cylinder 43. These valves may be of the usual type.

The hydraulic system for reciprocating the cylinder is designated by the assembly numeral 60 and comprises a pressure feed pipe 61 leading to the inlet 62 of the valve chamber 63. This pressure feed pipe receives its hydraulic fluid from a supply pipe 64 connected to any suitable reservoir for fluid under pressure or fluid pressure supply pumps. The exhaust or outlet 65 from the cylinder 43 and the valve mechanism have exhaust pipes 66 connected thereto and a waste pipe 67 leading back to a suitable reservoir or the like for supplying the pressure pump.

A pressure feed pipe 68 connects to the supply pipe 64 and to the feed pipe 61. This pipe connects to a return circulation unit 69 having a feeding branch 70 and an exhaust branch 71. Each of these have a control valve 72 and a check valve 73. A combination supply and exhaust pipe 74 leads to the dash pot and impulse cylinder 75 of the initial impulse mechanism 41. The hydraulic fluid has a supply flow in the direction of the arrow 76 and a return flow in the direction of the arrow 77 in the unit 69.

The impulse cylinder 75 has an enlarged chamber 80 therein in which operates the plunger 81 having a piston 82 thereon. This piston is of less diameter than the chamber 80, thus this forms a displacement mechanism for giving an initial impulse outwardly to the plunger 81 and acting as a dash pot to retard and stop the carriage on its return stroke, there being a constant pressure in the supply line 68 and a reverse flow in the exhaust pipe 74, this being indicated by the arrows 83. The cylinder 75 may be mounted in any suitable manner, as for instance by a stand 84 on the machine base 11. The outer end of the plunger 81 has a head 85 adapted to be engaged by a contact surface 86 on the end of the carriage opposite the contact surface 46.

To reverse the valve in the valve housing 63 and the valve plunger 54, such plunger is provided with a contact end 90 which is adapted to be engaged by a contact stud 92 having a head 93 indicated as secured at 94 to the end of the carriage having the contact face 46.

The hydraulic motor assembly 100 (note particularly Figs. 1 through 4) for driving the reel, includes a hydraulic motor which may be of a known type, which has a motor housing 101 with a rotor 102 therein connected to a main drive shaft 103 which is connected as indicated at 104 to one end of the expansion coupling 22 and thus drives the operating shaft 20 for turning the reel a partial rotation, in the present instance one-third of a turn to cut the column of clay. This motor has a control valve mechanism 105 with a fluid supply connection to the chamber 106 which has a connection to the valve cylinder 107 in which operates the valve 108, there being an exhaust or waste connection 109 from the motor. The fluid supply is the constant pressure and may be taken by a pipe 110 from the main supply pipe 64. The waste or exhaust may also be discharged into a reservoir which feeds the pressure pump.

The operation and control of the valve 108 is by means of a valve plunger 111 which has a connection at 112 to a bell crank 113, this being pivoted at 114 on the motor housing. To the opposite arm 115 is connected a link 116. This link has an eccentric 117 on the valve operating shaft 118. This shaft is suitably mounted in a stand 119 extending upwardly from the machine bed 11 (note Figs. 1 and 2).

The drive for the shaft 118 is by means of a gear 125 mounted on the shaft 118 which meshes with an intermittently driven gear 126. Such gear rotates freely on a ratchet stud 127 which may be secured to the support 119 and extends in a forward direction of the machine frame parallel to the shaft 118.

Figure 6:
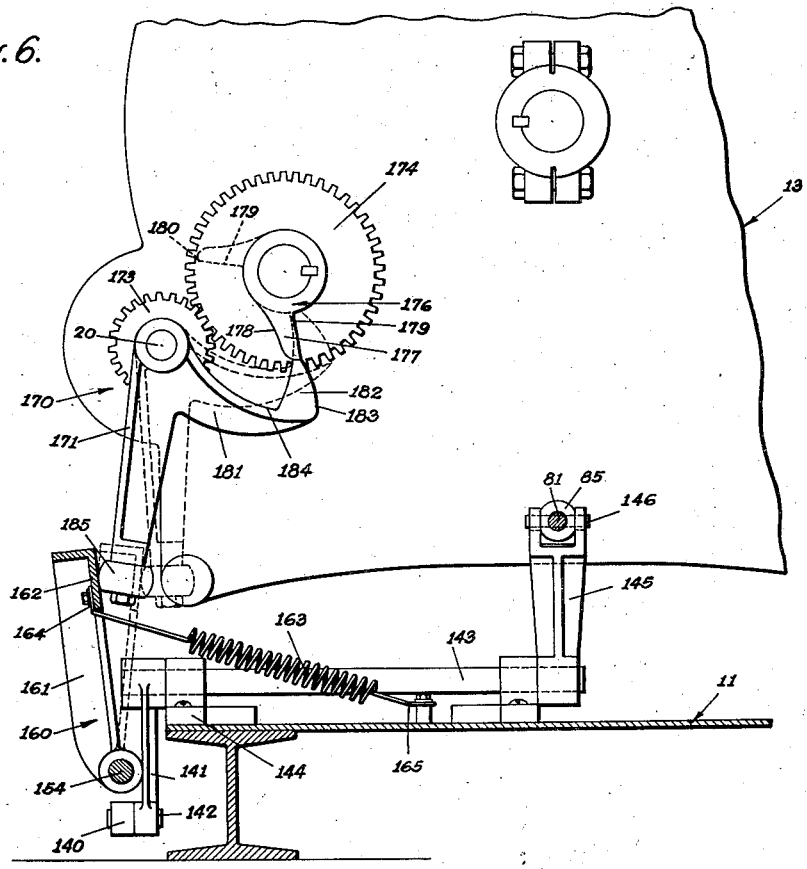
Fig. 6 is a partial vertical transverse section on the line 6—6 of Fig. 2 in the direction of the arrows, illustrating part of the mechanism for actuating the ratchets.

There are two ratchet wheels 130 and 131, each rigidly connected to the gear 126 (note Figs. 4 and 5) and these are located on opposite sides of the gear. The ratchet 131 is actuated by a pawl 132 (note Fig. 4) and pivotally connected to a pawl supporting yoke 133 rotatably mounted on the stud 127. A link 134 connects to this yoke and also to the rock arm 135 which is mounted on a rock shaft 136 mounted in a journal 137 on a journal block 138 supported on the machine frame 11. An outside rock arm 139 is connected to a long link 140 which extends longitudinally of the machine bed and connects to a rocker arm 141, the connection being at 142. This rocker arm 141 is connected to a long transverse rock shaft 143 (note Figs. 1, 2, 3, and 6); such rock shaft being mounted in journals 144 supported on the machine frame 11. An upwardly extending second rocker arm 145 (note particularly Fig. 6) is pivotally connected at its upper end 146 to the head 85 of the impulse and retarding plunger 81.

The ratchet wheel 130 on the opposite side of the gear 126 is operated as follows: A pawl 150 is pivoted on a pawl carrying yoke 151 rotatably mounted on the stud 127. A link 152 (note particularly Fig. 5) extends from this yoke to a transversely operating rocker arm 153, this arm being secured to a long rock shaft 154 mounted in journals 155 on the front of the machine bed 11 (note particularly Figs. 1, 2, and 3). Adjacent the feed end of the machine there is a rocker cradle 160 which has cradle arms 161 secured to the rock shaft 154; these arms being connected by a roller engaging track 162 (note particularly Fig. 6); this track extending longitudinally. A retraction spring 163 has one end 164 attached to the cradle and the other end 165 to a portion of the machine frame. This spring normally holds the yoke in the dotted line position of Fig. 6.

The actuating assembly 170 for oscillating the rock shaft 154 utilizes a rocker lever 171 which is for convenience, rotatably mounted on the end of the shaft 20. This shaft extends through a bearing 172 on the frame of the carriage. A driving gear 173 is secured to the shaft 20 which operates the cutting wires and meshes with a gear 174 rotatably mounted on a stud 175 (note Figs. 1 and 2), this stud being attached to the end of the carriage. The gear 174 has a cam 176 connected thereto, such cam being formed with a sharp projection 177 having a lifting face 178 and a drop 179, there being a tip end 180. This cam co-acts with a cam actuated lever 181, which for convenience may be formed integral with the rock arm 172 and thus the assembly being pivoted for oscillation on the end of the shaft 20. This cam actuated lever has a cam lug 182 at the end with a riser face 183 to be engaged by the face 178 of the cam and pressed outwardly to the full line position of Fig. 6. The lever has a cutout section 184 to accommodate the cam 177 on the drop of the cam lug 182 behind the drop face 179 of the cam 177. A roller 185 mounted on the end of the rock arm 171 engages the track 162 on the rocker cradle 160.

The gear 174 is operatively connected to a clamp, not illustrated, and forming part of the present practice for clamping the column of clay to the carriage so that at the desired moment the forward movement on the column of clay moves the carriage, thus holding the carriage and the moving column of clay relatively stationary so that the cutting wires of the reel make a clean sheer cut across the column.

The manner of operating and functioning of my invention is as follows: Presuming the carriage and the other parts of the mechanism are in the position shown in Fig. 1, this being the stationary initial position prior to the travel of the carriage with the column of clay and prior to the cutting operation, in this case the motor is stationary and hence the shaft 20 is stationary. The plunger 44 has been operated to thrust the carriage from the position of Fig. 2 to that of Fig. 1, but such plunger has been withdrawn to the full line position of Fig. 1. As there is a constant liquid pressure in the feed pipe 68, leading through the circulating unit 69 to the impulse mechanism 41, the piston of this unit is operated to have an outward movement from the full line position of Fig. 3 to the dotted line position. This starts the carriage on its movement longitudinally of the machine bed at the same time the clamp not forming part of this invention, for engaging the column of clay has been clamped to such column so that the carriage moves at the same rate as the column.

The outward movement of the head 85 on the plunger 81 rocks the rock arms 145, the rock shaft 143, the rock arm 141, thus giving a longitudinal movement to the link 140. This causes an operation of the ratchet mechanism acting on the ratchet wheel 131 through the medium of the bell crank mechanism composed of the arms 139, the rock shaft 136, the rock arm 135. The rotation of the gear 126 meshing with gear 125 through the medium of the eccentric shifts the link 116 (note Fig. 4) to operate the bell crank 113. This action opens the valve mechanism 105 supplying hydraulic fluid to the hydraulic motor which motor is thus driven and operates the shaft 20, which through the usual mechanism of the reel gives a partial rotation to the shearing wires and as these wires are moving longitudinally at the same rate as the column of clay, the cut is at right angles to the axis of the column. The driving of the shaft 20 causes its driving gear 173 to operate the cam gear 174 (note Fig. 6). This brings the cam 177 into operative action with the cam lug 182 on the cam actuated lever 181, thus actuating the rocker lever 171 to give a movement to the cradle 160 from the dotted to the full line position of Fig. 6. Such action causes a rocking of the long rock shaft 154 at the front of the machine and actuates the ratchet wheel 130 through the medium of the rock arm 153 and the link 152 (note Fig. 5). This gives a further rotation to the gear 126 and the gear 125 and the operation of the eccentric 117; thus actuating the link 116 to return the bell crank 113 to its initial position closing the supply to the motor and opening the exhaust. This causes the motor to instantly stop the motor acting as a hydraulic brake, bringing the shaft 20 to rest and the shearing wires also to rest after the completion of a shearing stroke.

Figure 2:
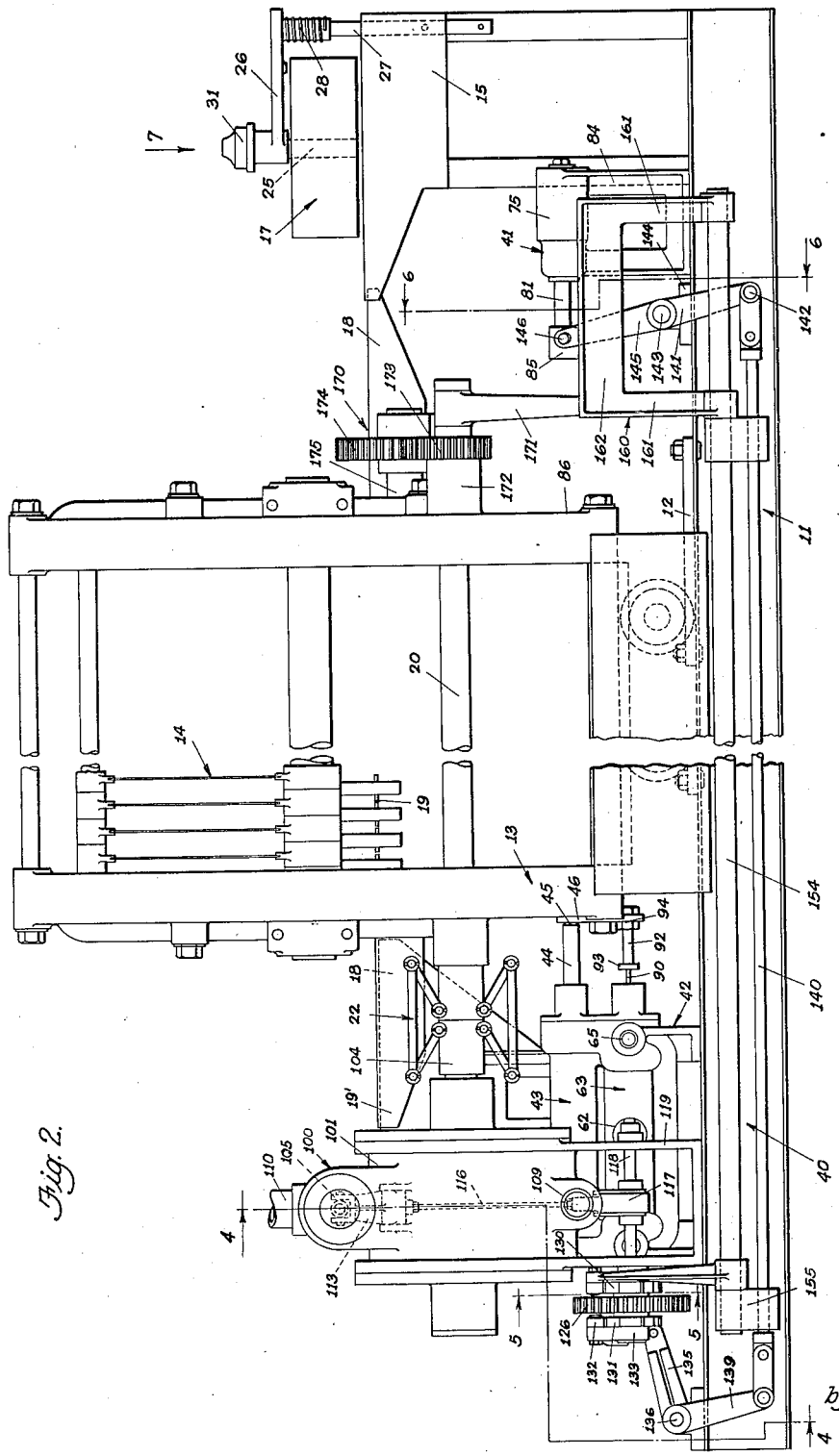
Fig. 2 is an elevation similar to Fig. 1, showing the carriage reel and the associated mechanism at the end of the stroke.

When the motor is brought to rest the carriage is in the position shown in Fig. 2 and in the final movement of the carriage the head 93 on the stud 92 has engaged the contact end 90 of the valve plunger 54 and reversed the valve of the reciprocating cylinder assembly 60. This action of driving in the plunger 54 also actuated the bell crank 51 from the dotted to the full line position of Fig. 3, thus elevating the armature 49 of the solenoid 47. The flow of hydraulic fluid from the pipe 61 then forces the reciprocating piston and the plunger rod 44 outwardly, that is, towards the infeeding end of the machine. The plunger end 45 engages the contact surface 46 of the carriage and bodily shifts the carriage from the position of Fig. 2 to that of Figs. 1 and 3. During this movement the column of clay has been continuously moving and operating the measuring drum 17 so that at the proper moment the timer or electrical distributor 31 causes an energizing of the solenoid 47, pulling this downwardly and thus rocking the bell crank 51 from the full to the dotted line position of Fig. 3, thus changing the position of the valve rod 54. This allows an exhaust from the cylinder of the impulse mechanism 42 to retract the plunger 44 from its projected position of Fig. 3 to the retracted position of Figs. 1 and 2. As this action relieves the pressure holding the carriage towards the infeeding end of the machine, the cycle of operation is again started by the initial impulse mechanism 41 having its plunger 81 forced outwardly to start the carriage on its path; the cycle of operation is thus repeated.

It will be apparent that instead of having the hydraulic motor mounted in a stationary position on the machine bed, it could be located directly on the carriage and have the valve ports for the motor stationary with flexible hose connections to the cylinder of the motor having the rotor. This enables a direct connection to be made to the shaft 20 without the use of the extensible coupling 22.

It is believed also obvious that an electric motor could be used instead of the hydraulic motor having this energized and de-energized at the proper times and also having the brake to instantly bring the electric motor to a stop at the end of its cycle of operations.

It will be understood that the measuring drum 17 may be on a horizontal axis if desired, either below or above the column of clay.

Various changes may be made in the details of construction without departing from the spirit or scope of the invention as defined by the appended claims.

I claim:

1. In a device as described in which a reciprocating carriage has an intermittently rotating cutting reel and a table for a column of clay, combined with a hydraulic motor having a valve mechanism, a first hydraulic impulse device to initiate the movement of the carriage, a second hydraulic return impulse mechanism to return the carriage after its operation to its initial position, a measuring means for the column of clay, an electric timer actuated thereby, an electro-magnetic device to control the return impulse mechanism, the hydraulic motor having means to rotate the reel, and means actuated in connection with the movement of the carriage to operate the valves of the motor.

2. In a device as claimed in claim 1, the means to operate the valves of the motor comprising two ratchet wheels and rock shafts to actuate said wheels, a connection from the first impulse mechanism to operate one rock shaft, and a connection from the drive of the reel to operate the second rock shaft.

3. In a device as claimed in claim 1, a hydraulic connection to the first impulse mechanism to constantly energize said mechanism, the second impulse mechanism having a cylinder with a plunger to return the carriage after the end of a stroke, the said cylinder and plunger overcoming the resistance of the first impulse mechanism to return the same to its initial position.

4. In a device as described, in which a carriage is mounted for reciprocation on a machine bed, the carriage having a table for transmission of a column of clay thereover and a cutting reel intermittently rotatably mounted in the carriage combined with a measuring means for the column of clay having an electric timer connected thereto, a first impulse mechanism having a first plunger to engage the carriage at the feeding end and give such carriage an initial impulse in its movement, a second impulse mechanism having a plunger to engage the opposite end of the carriage and return the carriage to its initial position, a hydraulic motor operatively connected to intermittently rotate the reel, a valve mechanism for said motor, a power fluid connection having a constant pressure with a connection to the first impulse mechanism, the second impulse mechanism having a valve with an electro-magnetic device connected to the timer to operate the said valve of the second impulse mechanism to retract its plunger, means on the carriage to actuate the valve of the second impulse mechanism in a reverse manner, an operative connection between the plunger of the first impulse mechanism to operate the valve of the motor, means operated by the drive of the reel to also operate the valve of the motor in a different part of its cycle, whereby when the carriage starts its movement the motor is energized to operate the reel to cut the column of clay, the motor being deenergized at the end of the travel of the carriage.

5. In a device as described, in which a reciprocating carriage operates on a machine bed and has an intermittently rotatable cutting reel, a table for a column of clay, a measuring means for the column of clay fed to the table, combined with an electric timer operated by the measuring means, a first valveless hydraulic impulse device having a first plunger to engage one end of the carriage and give the carriage an impulse in its travel for cutting the clay, a second hydraulic impulse device having a cylinder with a second plunger and a valve mechanism, an electromagnetic means connected to the timer to operate the said valve to retract the second plunger and permit movement of the carriage, and a motor operatively connected to the reel to give the reel a partial rotation during the movement of the carriage to cut the column of clay.

6. In a device as claimed in claim 5, a contact means on the carriage to reverse the said valve at the end of the travel of the carriage and energize the cylinder of the second impulse mechanism to move the second plunger outwardly, the second plunger engaging one end of the carriage to return it to its original position, means actuated by the movement of the valve to reset the electromagnetic device for a second operation.

7. In a device as claimed in claim 5, the said motor being of a hydraulic type and having a motor valve, means operated by the impulse movement of the first plunger to actuate the motor valve to energize the motor for partial rotation of the reel, means operated by the reel at the end of the cutting stroke to again operate the motor valve to deenergize the motor.

8. In a device as claimed in claim 5, the said motor having a hydraulically operated rotor with a driven shaft for rotating the reel, the motor having a valve mechanism with a pair of alternately operating ratchet wheels to actuate the motor valve, an operating connection from the first plunger to actuate one of the ratchet wheels and move the motor valve to energize the motor for rotation of the driven shaft and the partial rotation of the reel, means operated by the driven shaft of the motor to operate the second ratchet wheel to reverse the valve of the motor and deenergize the motor, bringing the rotor and the driven shaft and reel to rest.

9. In a device as claimed in claim 5, the motor having a hydraulically operated rotor with a drive shaft connected thereto to rotate the reel, a motor valve, a pair of ratchet wheels to operate the motor valve, a link having a connection to the first plunger of the first impulse device and a connection from the link to actuate one of the ratchet wheels and thereby operate the valve of the motor, a rock shaft, means operated by the driven shaft of the rotor to actuate the rock shaft, and means operated by the said rock shaft to actuate the motor valve, whereby the motor is energized at the beginning of travel of the carriage in its work movement to rotate the reel a partial turn to cut the column of clay and then after cutting the column the motor is deenergized and brought to rest, the said rotor of the motor having means to operate as a brake.

10. In a device as described in which a reciprocating carriage operates on a machine bed and has an intermittently rotatable cutting reel, a table for a column of clay, a measuring means for the column of clay fed to the table combined with a hydraulic motor having a rotor and a motor control valve, a driving connection from the rotor to the reel to rotate the reel always in one direction with intermediate pauses, a first impulse means to initiate the carriage during its work movement, an interconnection between the said impulse means and the motor valve to operate said valve in part of a cycle, means operatively connected to the rotational drive for the reel to actuate the motor valve in another part of the cycle, and a second impulse means to return the carriage to its initial position after the completion of its work stroke, the control of the motor valves being operative to cause the rotation of the rotor a sufficient amount to rotate the reel a part of a complete revolution, the motor valve being adapted in another portion of its cycle to develop a back pressure against the rotor whereby the rotor operates as a brake to stop the rotation of the reel and to hold the reel in its non-rotated position.

11. In a device as claimed in claim 10, the connection between the first impulse means and the motor valve including a ratchet wheel, a link extending longitudinally of the machine bed, a connection from the first impulse means to the link and a second connection from the link to operate the said ratchet wheel a portion of a rotation and a connection from the ratchet wheel to the motor valve including a gear drive with an eccentric operated by a driven gear.

12. In a device as claimed in claim 10, the connection from the drive for the reel to the motor valve including a rock shaft extending longitudinally of the machine bed, a cradle connected thereto, means to actuate said cradle to rock the shaft, a ratchet wheel, a connection from the opposite ends of the rock shaft to turn the ratchet wheel a portion of a turn, a connection from the ratchet wheel to the motor valve including a driving and a driven gear, and an eccentric operated by the driven gear.

13. In a device as claimed in claim 10, the means to operate the motor valve in its cycle comprising two ratchet wheels connected to a driving gear, a link extending longitudinally of the machine bed, means connected to the first impulse means to move said link in one direction on the work stroke of the said impulse means, a driving connection from the link to one of the ratchet wheels, a rock shaft extending longitudinally of the machine bed and having a cradle, an operating means for the cradle mounted on and moving with the carriage, said means being actuated from the rotational drive for the reel, an operating connection from the said rock shaft to the second ratchet wheel, a driven gear operated by the driving gear, an eccentric operated by the driven gear and a connection from the eccentric to the motor valve.

14. A device as claimed in claim 10, the first impulse means having a hydraulic cylinder with a plunger, a hydraulic means maintaining a constant pressure in the cylinder, whereby on release of the second impulse means the said plunger is forced outwardly to initiate the movement of the carriage.

15. A device as claimed in claim 10, the second impulse means comprising a cylinder with a plunger, a control valve for movement of the plunger, an electric timer operated by the measuring means, an electro-magnetic device connected thereto and having means to actuate the valve for controlling the plunger, a contact means on the carriage to actuate the valve in a direction opposite to that of the electro-magnetic means and to reset the electro-magnetic means for a second operation, in one part of the cycle of the said latter valve the plunger being retracted to permit the work stroke of the carriage and in another part of the cycle the plunger being extended to return the carriage to its initial position.

16. In a device as claimed in claim 10, the first impulse means comprising a hydraulic cylinder with a plunger connected thereto, a hydraulic connection to said cylinder under constant pressure, the second impulse means having an impulse cylinder with a second plunger operating therein, a plunger control valve for operating the latter plunger, an electric timer operated by the measuring means, an electro-magnetic means interconnected therewith, a connection therefrom for operating the valve of the second impulse means, a contact device on the carriage to operate said latter valve in a reverse manner to that of the electro-magnetic means and to reset the said latter means, whereby in the cycle of operations the plunger of the second impulse means is retracted and the plunger of the first impulse means initiates the movement of the carriage, then at another portion of the cycle the contact means reverses the valve of the second impulse means for operation of its plunger to return the carriage to its initial position.

17. In a device as described, in which a reciprocating carriage operates on a machine bed and has an intermittently rotatable cutting reel, a table for a column of clay, a measuring means for the column fed to the table, a hydraulic motor having a motor valve, said motor having a rotor, a drive from the rotor to the reel, a means for operating the valve in part of a cycle, comprising a cam on the carriage operated in connection with the rotation of the reel, a rocker lever also mounted on the carriage and actuated by the cam, a tiltable cradle mounted on the machine bed and actuated in one direction by the said rocker lever, an operative connection from the cradle to the valve to actuate the valve in part of its cycle, and means to operate the valve in another part of its cycle.

18. In a device as claimed in claim 17, the means to actuate the valve in the second part of its cycle comprising a first impulse means to initiate the movement of the carriage during its work stroke, a link actuated by the said impulse means and a connection from said link to the motor valve to actuate said valve in the second part of its cycle.

19. In a device as described, in which a reciprocating carriage supports a column of plastic material and an intermittently rotatable cutter cuts the column during a work stroke of the carriage, comprising a first hydraulic means operative to hold the carriage at its initial position, said means being operative to release the carriage for its work stroke, a second hydraulic means operated to initiate the work stroke of the carriage, a third hydraulic means having a connection to actuate the cutters in a partial rotation to cut the column during a work stroke of the carriage, said third means being operative to bring the cutters to rest and to retain the cutters at rest during the return stroke of the carriage, the first hydraulic means being operative to return the carriage to its initial position on a non-working stroke.

20. In a device as described in which a reciprocating carriage has an intermittently rotating cutting reel and a table for a column of clay, combined with a motor having a motor control mechanism, a first hydraulic impulse device to initiate the movement of the carriage, a second hydraulic return impulse mechanism to return the carriage after its operation to its initial position, a measuring means for the column of clay, an electric timer actuated thereby, an electromagnetic device to control the return impulse mechanism, the motor having means to rotate the reel, and means actuated in connection with the movement of the carriage to operate the motor control mechanism.

21. In a device as described, in which a carriage is mounted for reciprocation on a machine bed, the carriage having a table for transmission of a column of clay thereover and a cutting reel intermittently rotatably mounted in the carriage combined with a measuring means for the column of clay having an electric timer connected thereto, a first impulse mechanism having a first plunger to engage the carriage at the feeding end and give such carriage an initial impulse in its movement, a second impulse mechanism having a plunger to engage the opposite end of the carriage and return the carriage to its initial position, a motor operatively connected to intermittently rotate the reel, a motor control mechanism for said motor, a power fluid connection having a constant pressure with a connection to the first impulse mechanism, the second impulse mechanism having a valve with an electromagnetic device connected to the timer to operate the said valve of the second impulse mechanism to retract its plunger, means on the carriage to actuate the valve of the second impulse mechanism in a reverse manner, an operative connection between the plunger of the first impulse mechanism to operate the motor control mechanism of the motor, means operated by the drive of the reel to also operate the motor control mechanism of the motor in a different part of its cycle, whereby when the carriage starts its movement the motor is energized to operate the reel to cut the column of clay, the motor being de-energized at the end of the travel of the carriage.

22. In a device as described, in which a reciprocating carriage operates on a machine bed and has an intermittently rotatable cutting reel, a table for a column of clay, a measuring means for the column fed to the table, a motor having a motor control mechanism, said motor having a rotor, a drive from the rotor to the reel, a means for operating the valve in part of a cycle, comprising a cam on the carriage operated in connection with the rotation of the reel, a rocker lever also mounted on the carriage and actuated by the cam, a tiltable cradle mounted on the machine bed and actuated in one direction by the said rocker lever, an operative connection from the cradle to the motor control mechanism to actuate such mechanism in part of its cycle and means to actuate said mechanism in another part of its cycle.

23. In a device as described, in which a reciprocating carriage supports a column of plastic material and an intermittently rotatable cutter cuts the column during a work stroke of the carriage, comprising a first hydraulic means operative to hold the carriage at its initial position, said means being operative to release the carriage for its work stroke, a second hydraulic means operated to initiate the work stroke of the carriage, a third means having a connection to actuate the cutters in a partial rotation to cut the column during a work stroke of the carriage, said third means being operative to bring the cutters to rest and to retain the cutters at rest during the return stroke of the carriage, the first hydraulic means being operative to return the carriage to its initial position on a non-working stroke.

DAVIS BROWN.